United States Patent Office 2,871,233
Patented Jan. 27, 1959

2,871,233

COBALT CONTAINING AZO DYESTUFFS

Helmut Pfitzner and Otto Kaufmann, Ludwigshafen (Rhine), Germany, assignors to Badische Anilin- & Soda-Fabrik Aktiengesellschaft, Ludwigshafen (Rhine), Germany No Drawing. Application June 14, 1955
Serial No. 515,554

Claims priority, application Germany June 16, 1954

1 Claim. (Cl. 260—151)

This invention relates to a new group of cobalt containing azo dyestuffs having a brown, red or blue color and to a method of manufacturing these dyestuffs.

Among the principal objects of this invention are provisions for new azo dyestuffs which contain in their molecule about one atom of cobalt for two organic radicals, each of these radicals having one azo group.

Another object is to provide a method of manufacturing such dyestuffs by reacting particular azo dyestuffs with cobalt compounds.

A further object is to supply new azo dyestuffs having a very good light fastness which dye wool evenly and which are also suitable for dyeing polyamide articles such as polyamide fibers and fabrics.

Other objects and advantages will be apparent from the more detailed description of the invention.

These objects are accomplished by diazotizing alkoxy aminobenzene sulfonic acid amides of the general formula

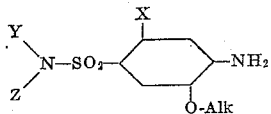

wherein X is a hydrogen, halogen, alkyl or alkoxy radical; Y is a hydrogen, alkyl or aryl radical; Z is a hydrogen, alkyl or aryl radical; and Alk is an alkyl radical. The diazonium compound is coupled with a phenolic or enolic compound of the benzene, naphthalene or quinoline series which is free from sulfonic acid groups and couples in ortho position to its hydroxy group, and the formed monoazo dyestuff is then converted to a complex compound which contains about one cobalt atom for two azo groups. In the above formula, the alkyl and alkoxy groups are preferably lower alkyl and lower alkoxy groups containing advantageously from one to four carbon atoms.

Suitable alkoxy aminobenzene sulfonic acid amides are for example 1-methoxy-2-aminobenzene-5-sulfonamide;
1-ethoxy-2-aminobenzene-4-chloro-5-sulfonamide;
1-methoxy-2-aminobenzene-4-ethoxy-5-sulfonic acid methylamide;
1-methoxy-2-aminobenzene-4-methoxy-5-sulfonic acid dimethylamide;
1-methoxy-2-aminobenzene-4-chloro-5-sulfonic acid dimethylamide;
1-methoxy-2-aminobenzene-4-chloro-5-sulfonic acid phenylamide.

The aminobenzenes which can be used in the practice of our invention are diazotized and coupled with phenolic or enolic compounds which couple in ortho position to the hydroxyl group. If the coupling in ortho position is ensured the phenols may contain any number and any type of substituents, such as halogen, alkyl or amino groups. If the phenols contain amino groups, the hydrogen atoms of the amino groups may be substituted by one or two alkyl radicals or one acyl radical. As examples of such compounds there may be mentioned substituted phenols, such as para cresol, halogenated phenols, meta or para amino or N-alkylated amino phenols, and N-acetyl or N-benzoyl amino phenols. Other suitable coupling compounds are those coupling in ortho position to a hydroxyl group, for example, naphthols, oxyquinolines or quinolones, such as 2-oxynaphthalene, 1-amino-7-hydroxynaphthalene, the amino group of which has been substituted by an acyl or carboalkoxy group, 2-hydroxy - 6 - bromonaphthalene, 1 - hydroxy - 5,8 - dichloro - naphthalene, 1 - hydroxy - 4 - benzoyl - naphthalene, 1-methyl-2,4-dioxo-1,2,3,4-tetrahydroquinolone.

The azo dyestuffs obtained by the coupling reaction are converted to the complex cobalt containing dyestuffs by reacting them with cobalt compounds according to the conditions described in the American patent specification 2,230,686. According to this method the azo dyestuffs are heated in a liquid medium containing the cobalt compound and acid amides or ammonium salts of carboxylic acids. Among suitable amides there are mentioned, for example, formamide, acetamide, benzamide, malonic acid diamide or urea. Suitable ammonium salts are, for example, ammonium formate and acetate.

Instead of the compounds listed in the above-mentioned U. S. patent specification ammonia or amines, such as methylamine, ethylamine, hexylamine, dodecylamine, diethylamine, trimethylamine, and pyridine can also be used as solvents. The presence of water is harmless. In a convenient manner of working the azo component is mixed with the metal compound and the solvent and the mixture is heated to the required temperature. Another method of working consists in using the molten ammonium salts of aliphatic carboxylic acids as solvents or converting the amides of aliphatic carboxylic acids into the respective ammonium carbonates by heating with aqueous metal salt solutions and causing the complex metal dyestuff to be formed in the melt obtained after introducing the azo component. Other suitable solvents are, for example, polyhydric alcohols, triethanolamine or ketones.

The cobalt compounds may be for example the formate, acetate, sulfate, chloride or any other salt of bivalent and trivalent cobalt. Other suitable cobalt compounds are complex compounds of the formula

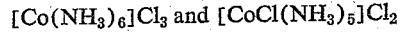

The cobalt salts or complex compounds need not be readily soluble in the solvents used, since very small amounts of dissolved cobalt compound will already be sufficient to set the reaction to the complex metal dyestuff going and terminate it completely. As a rule, for two molecules of the monoazo dyestuffs, about one molecule of the cobalt compound is used. During the reaction with the azo dyestuffs bivalent cobalt is converted to trivalent cobalt. The reaction between the azo dyestuffs and the cobalt compounds, which is usually called a metallization, is preferably carried out at a temperature between 100 to 150° C. Generally a reaction time between one and five hours is required. It is not necessary to maintain a definite pH-value, if the metallization is carried out in the manner above referred to.

The alkoxy groups adjacent to the azo groups are transformed during the reaction with the cobalt compounds into hydroxyl groups, and the hydroxyl groups react with the cobalt compounds. It is, however, advantageous to use as initial material for this novel complex dyestuff 1-alkoxy-2-aminobenzene sulfonic acid amides instead of the corresponding 1-hydroxy-2-aminobenzene sulfonic acid amides, because the alkoxy compounds are more readily available and couple easier.

The new cobalt complex dyestuffs obtained by the above reaction have in their anionic form the general formula

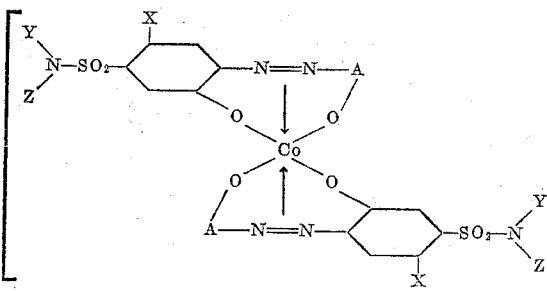

In this formula X, Y and Z have the same meaning as defined for the 1-alkoxy-2-aminobenzene sulfonic acid amides used as initial material; A stands for an aryl, a naphthalene, a quinolyl or a dihydro-2-oxo-quinolyl radical containing the linkage to the azo group and the linkage to the oxygen atom connected with the cobalt atom on adjacent carbon atoms.

If 1-hydroxy-4-methyl benzene is used as coupling compound, dyestuffs of the general formula

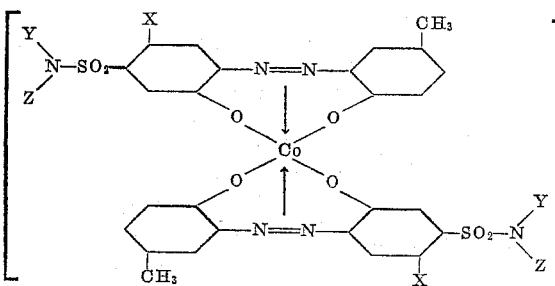

are obtained.

For the reaction with the cobalt compounds, equimolecular mixtures of two different azo dyestuffs may be used instead of only one azo dyestuff, or equivalent proportions of several azo dyestuffs may be used. In addition to the described azo dyestuffs in such mixtures, one of the components may be another azo dyestuff, for example, an azo dyestuff obtained by coupling a diazotized aminobenzene sulfonic acid amide with a pyrazolone derivative. The following general formula includes these unsymmetrical dyestuffs

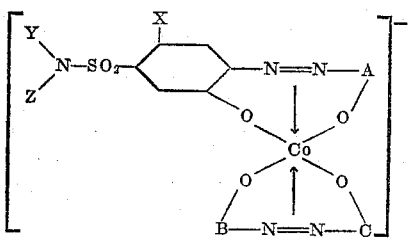

In this formula X, Y and Z have the same meaning as defined for the 1-alkoxy-2-aminobenzene sulfonic acid amides employed as initial material; A stands for an aryl, a quinolyl or dihydro-2-oxo-quinolyl radical which contains the linkage to the azo group and the linkage to the oxygen atom connected with the cobalt atom on adjacent carbon atoms; B and C are organic radicals, preferably aromatic radicals or heterocyclic such as quinolyl or dihydro-2-oxoquinolyl or pyrazole radicals containing the linkage to the azo group and the linkage to the oxygen atom connected with the cobalt atom on adjacent carbon atoms.

The new complex azo dyestuffs are very fast to light, perspiration and washing, and give very even shades. In many cases, they have a surprisingly better light fastness than the chromium containing complex azo dyestuffs. For example the complex cobalt dyestuff from 1,4-dimethoxy-2-aminobenzene-5-sulfonamide and 2-hydroxynaphthalene (cf. Example 11) has a light fastness of 7, whereas the corresponding complex chromium dyestuff has a light fastness of only 5 to 6. The new complex cobalt dyestuffs can be used by themselves or in mixtures with each other or with other metal-containing or metal-free azo dystuffs. They are of particular interest for dyeing wool and polyamide textiles, fibers, fabrics or other polyamide articles. The term polyamide includes the condensation products obtained from diamines and dicarboxylic acids, from aminocarboxylic acids, from lactames, or from mixtures of such compounds. The dyestuffs are applied from a neutral or slightly acid bath.

The following are representative examples of the invention, and it is to be understood that the invention is not limited thereto nor to the specific compounds, proportions or procedures therein, which are set forth only for purposes of illustration. The parts are by weight. The raction of initial materials in Examples 4 to 17 is performed as in Examples 1 and 2.

*Example 1*

20 parts of the monoazo dyestuff obtained by coupling diazotized 1 - methoxy - 2 - amino-4-methyl-benzene-5-sulfonic acid amide to 1-oxy-4-isobutyl benzene are heated with a solution of 11 parts of cobalt acetate in 200 parts of acetamide for five hours at 130° C. The reaction mixture is introduced then into 200 parts of water, and 200 parts of sodium chloride are added to this mixture. The precipitated dyestuff is filtered, washed with water and dried at 80° C.

The dyestuff dyes wool in a slightly acid bath in a Bordeaux red shade having very good fastness properties.

Instead of cobalt acetate, other cobalt salts such as cobalt formate, chloride, sulfate and complex cobalt compounds, such as $[Co(NH_3)_6]Cl_3$ and $[CoCl(NH_3)_5]Cl_2$ are suitable, the particular kind of cobalt salt or complex cobalt compound used being selected with regard to their availability.

*Example 2*

8 parts of $CoCl_2.6H_2O$ are dissolved in 200 parts of pyridine. Into this solution are introduced at a temperature of 100° C. 21 parts of an azo dyestuff obtained by coupling diazotized 1,4-dimethoxy-2-amino-benzene-5-sulfonic acid amide to 1-carbomethoxyamino-7-naphthol. The reaction mixture is refluxed for four hours and poured into 200 parts of water. A blue dyestuff is filtered and dried.

This dyestuff has in its anionic form the formula

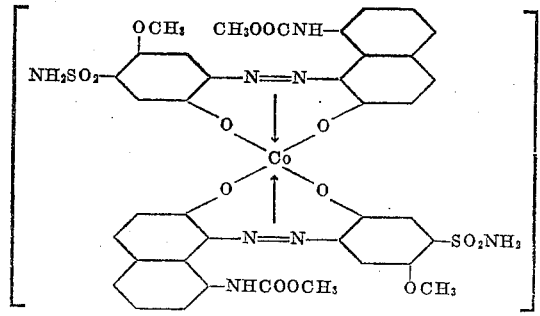

*Example 3*

8 parts of $CoCl_2.6H_2O$ are dissolved in 200 parts of acetamide. To this solution are added:

(a) 9 parts of the azo dyestuff obtained by coupling diazotized 1-methoxy-2-amino - 4 - methylbenzene - 5-sulfonic acid-methylamide to 1-acetamino-7-oxynaphthalene; and (b) 10 parts of the azo dyestuff obtained by coupling diazotized 1-methoxy-2 - amino - benzene - 4 - sulfonic acid-methylamide to 1-phenyl-3-methyl-pyrazolone-5.

The mixture is heated for five hours to 150° C. and poured into 200 parts of water. The brown dyestuff obtained is filtered, washed with water and dried.

*Examples 4–17*

In like manner, new complex cobalt dyestuffs are produced according to the invention by reacting one of the described cobalt compounds with the azo dyestuffs obtained by coupling the diazo compounds of the following amines with the indicated coupling compounds.

| Example | Amine | Coupling Compound | Shade of the Dyeing on Wool |
|---|---|---|---|
| 4 | 1-methoxy-2-amino-4-methyl-benzene-5-sulfonamide. | 1-methyl-2,4-dioxo-1,2,3,4-tetrahydroquinoline. | Yellowish-red. |
| 5 | ----do---- | 1-hydroxy-2,4-dichlorobenzene. | Bordeaux red. |
| 6 | ----do---- | 2-hydroxy-naphthalene. | Violet. |
| 7 | ----do---- | 1-hydroxy-5,8-dichloronaphthalene. | Do. |
| 8 | 1-methoxy-2-amino-4-methyl-benzene-5-sulfonic acid ethylamide. | 1-acetamino-7-hydroxy-naphthalene. | Reddish-blue. |
| 9 | 1-methoxy-2-amino-4-chlorobenzene-5-sulfonic acid-phenylamide. | 1-hydroxy-4-methyl-benzene. | Bordeaux red. |
| 10 | 1-methoxy-2-amino-4-chlorobenzene-5-sulfonamide. | 1-carbomethoxyamino-7-hydroxy-naphthalene. | Blue. |
| 11 | 1,4-dimethoxy-2-aminobenzene-5-sulfonamide. | 2-hydroxy-naphthalene. | Bluish-violet. |
| 12 | ----do---- | 2-hydroxy-6-bromonaphthalene. | Do. |
| 13 | ----do---- | 1-hydroxy-5,8-dichloro-naphthalene. | Reddish-blue. |
| 14 | 1,4-diethoxy-2-aminobenzene-5-sulfonic acid-methylamide. | 1-acetamino-7-hydroxynaphthalene. | Blue. |
| 15 | 1-methoxy-2-amino-4-methyl-benzene-5-sulfonamide. | 1-hydroxy-4-benzoyl-naphthalene. | Violet. |
| 16 | 1,4-diethoxy-2-aminobenzene-5-sulfonic acid-dimethylamide. | 1-hydroxy-4-acetaminobenzene. | Do. |
| 17 | 1,4-diethoxy-2-aminobenzene-5-sulfonamide. | 1-hydroxy-3-diethylaminobenzene. | Do. |

The dyestuff of Example 11 above has in its anionic form the formula

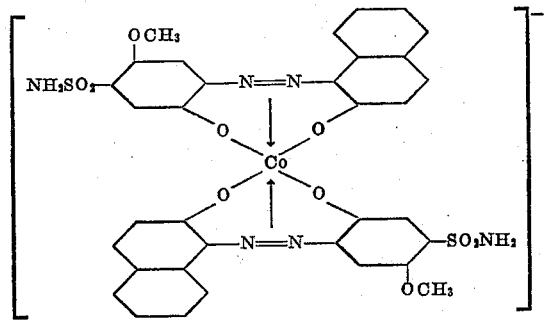

The dyestuff of Example 12 above has in its anionic form the formula

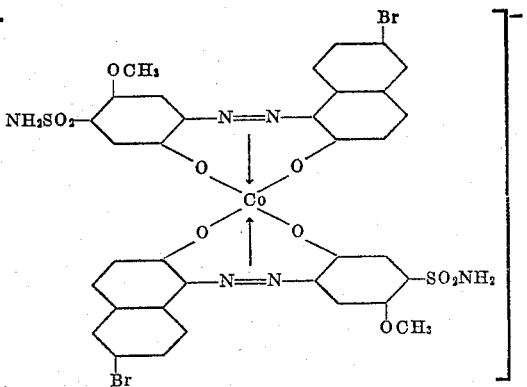

The dyestuff of Example 14 above has in its anionic form the formula

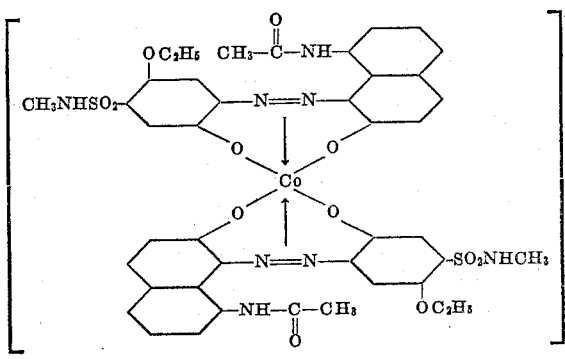

The invention is hereby claimed as follows:

A complex cobalt-containing azo dyestuff having in its anionic form the formula

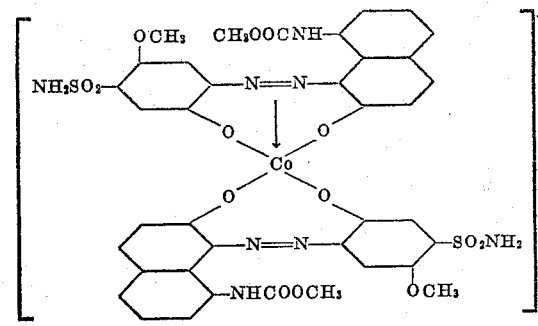

References Cited in the file of this patent

UNITED STATES PATENTS

| 2,230,686 | Holzach et al. | Feb. 4, 1941 |
| 2,671,081 | Bilings et al. | Mar. 2, 1954 |
| 2,673,199 | Widmer et al. | Mar. 23, 1954 |
| 2,749,332 | Buehler et al. | June 2, 1956 |
| 2,757,172 | Schetty et al. | July 31, 1956 |

FOREIGN PATENTS

| 1,061,365 | France | Nov. 25, 1953 |